United States Patent [19]

Flasche et al.

[11] Patent Number: 4,816,085

[45] Date of Patent: Mar. 28, 1989

[54] TOUGH WELDABLE DUPLEX STAINLESS STEEL WIRE

[75] Inventors: Lee H. Flasche, Kokomo; Narasi Sridhar, Carmel, both of Ind.

[73] Assignee: Haynes International, Inc., Kokomo, Ind.

[21] Appl. No.: 85,119

[22] Filed: Aug. 14, 1987

[51] Int. Cl.$^4$ .............................................. C22C 38/42
[52] U.S. Cl. ................... 148/327; 420/49; 420/52; 219/146.23
[58] Field of Search ............... 420/49, 52, 53, 57–59; 148/327; 219/146.23, 85 R, 85 H; 428/606, 576

[56] References Cited

U.S. PATENT DOCUMENTS

| | | | |
|---|---|---|---|
| 3,726,668 | 4/1973 | Bäumel | 420/46 |
| 3,785,787 | 1/1974 | Yokota et al. | 420/50 |
| 3,910,788 | 10/1975 | Fujioka et al. | 420/45 |
| 4,032,367 | 6/1977 | Richardson et al. | 420/57 |
| 4,055,448 | 10/1977 | Fujikura et al. | 420/61 |
| 4,099,966 | 7/1978 | Chivinsky et al. | 420/46 |
| 4,390,367 | 6/1983 | Niehaus et al. | 420/57 |

FOREIGN PATENT DOCUMENTS 51-43807 11/1976 Japan .................................. 420/57

OTHER PUBLICATIONS

Metals Handbook Ninth Edition, vol. 6, "Welding, Brazing, and Soldering" Glossary/p. 7.
Metals Handbook, Desk Edition, "Glossary of Metallurgical Terms and Engineering Tables"/p. 1.16.

Primary Examiner—Deborah Yee
Attorney, Agent, or Firm—Joseph J. Phillips

[57] ABSTRACT

Disclosed is a duplex stainless steel containing about 25% chromium, about 2% copper, about 3% molybdenum, about 0.2% nitrogen, about 9% nickel and the balance iron plus modifying elements and impurities. In corrosion conditions, including severe pitting environments, the steel contains up to 3%, and preferably 0.2 to 1.0% niobium. The alloy is especially suited for use as a welding filler material. The steel, after welding, has improved Charpy impact properties, increased tensile ductility and corrosion resistance. The steel is also suited for use in the form of cast, wrought or powder products.

5 Claims, 2 Drawing Sheets

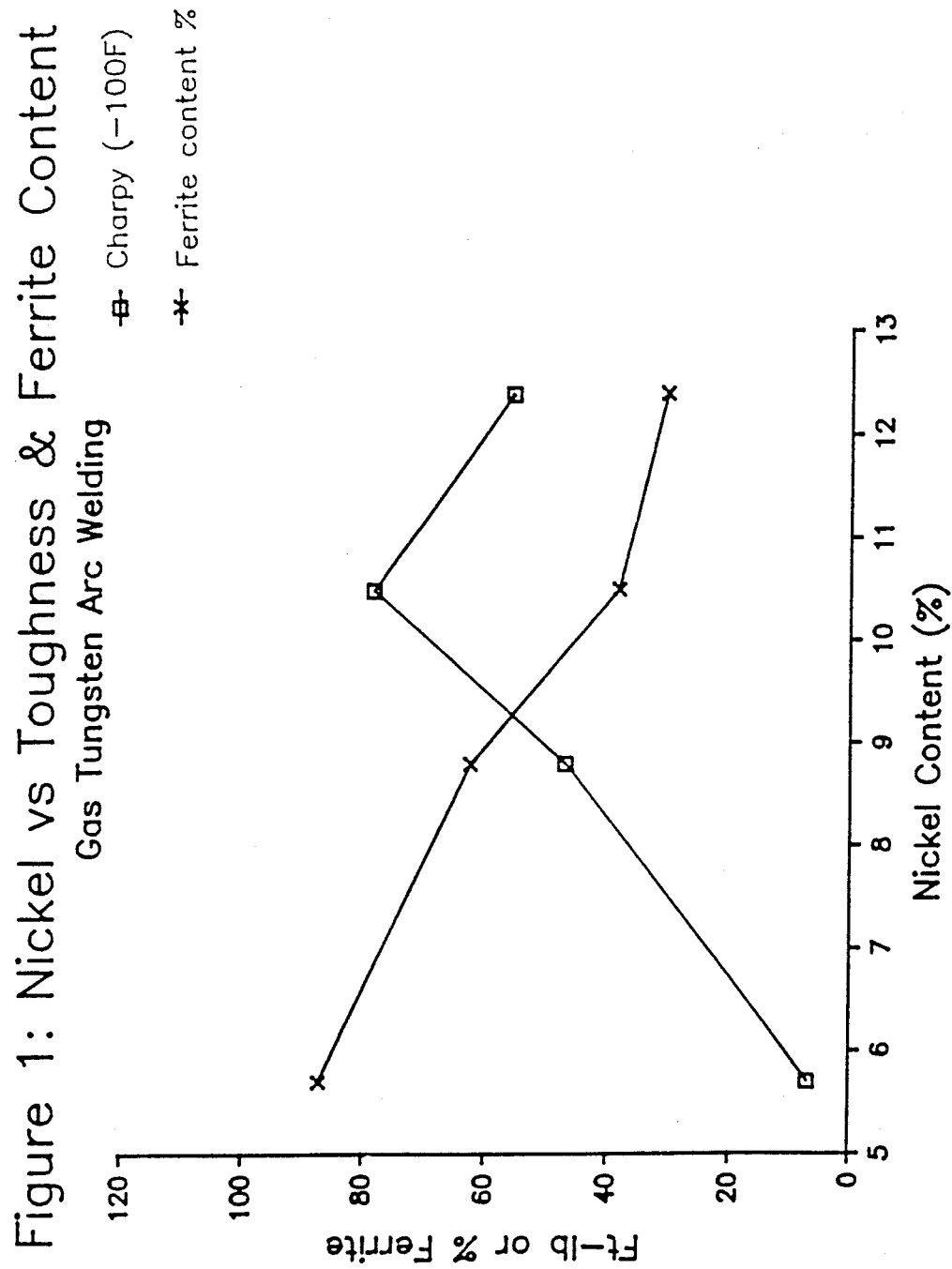

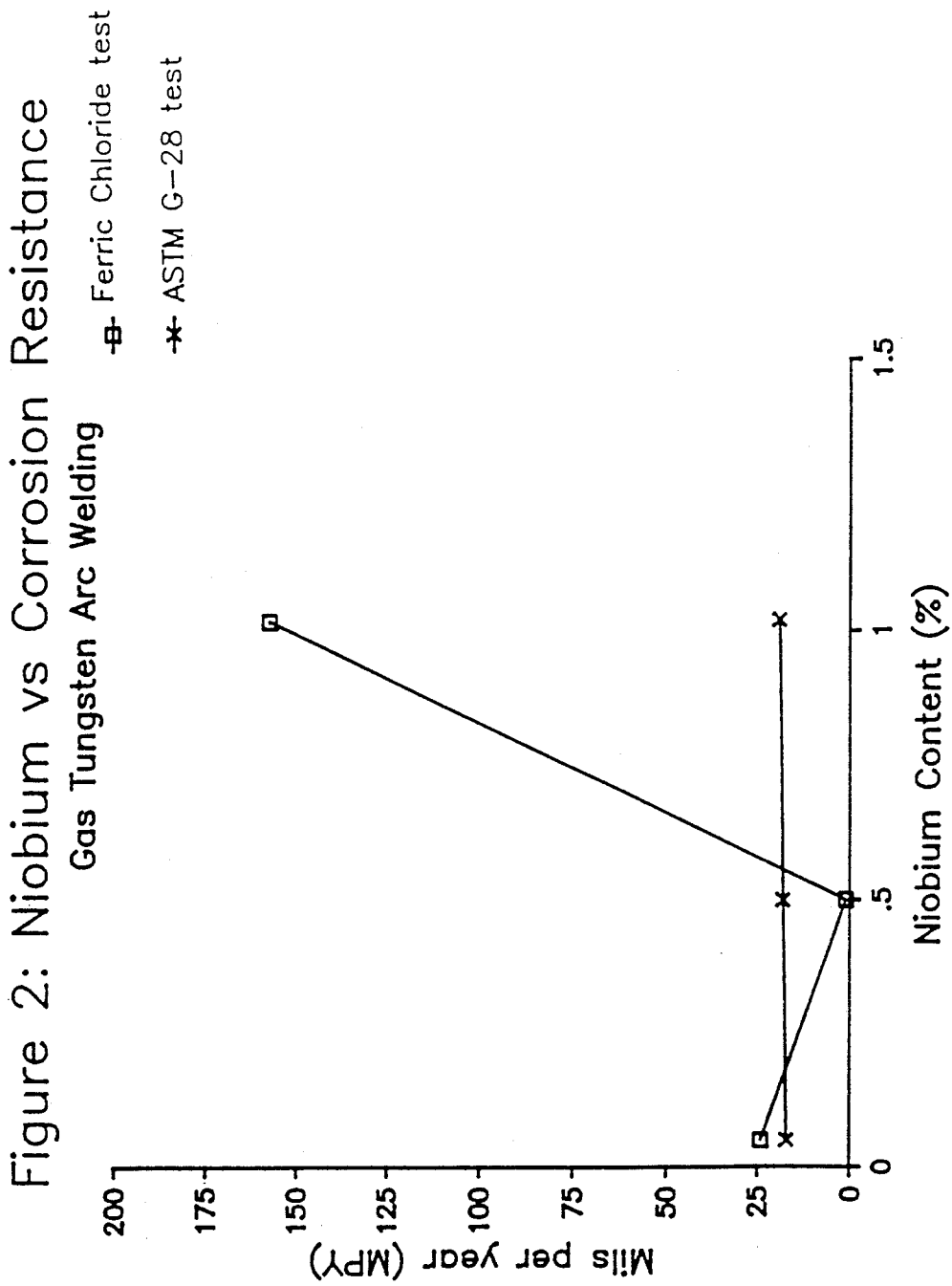
Figure 2: Niobium vs Corrosion Resistance
Gas Tungsten Arc Welding

TOUGH WELDABLE DUPLEX STAINLESS STEEL WIRE

INTRODUCTION

This invention relates to stainless steels containing a duplex ferritic-austenitic structure, add, more specifically, to a duplex stainless steel especially suitable for use as a welding filler material with increased tensile ductility, impact strength, and corrosion resistance.

BACKGROUND AND PRIOR ART

Known in the art is a duplex stainless steel (Alloy 255) commercially identified under the trademark FERRALIUM ® registered by Bonar Langley Alloys Ltd. The alloy is disclosed in U.S. Pat. No. 3,567,434 granted on Mar. 2, 1971. The background and development of the advantages of the duplex ferritic-austenitic structure is described in the patent.

Alloy 255 is used for welding operations as welding filler material. The all-weld-metal properties are generally acceptable except for toughness, ie, low impact strength. Thus, special attention must be made to weldments made with Alloy 255 as the weld filler material. This problem has been known in the art thereby tending to reduce the full marketing exploitation of welded duplex stainless steels.

Other duplex steels are described in U.S. Pats. Nos. 4,585,479 and 3,082,082 and U.K. Patent Application No. GB 2,160,221A.

U.S. Pat. No. 4,585,479 discloses an alloy system containing 7% to 12% nickel and specifically teaches against contents of molybdenum and copper.

U.S. Pat. No. 3,082,082 discloses an alloy system that did not appreciate the control of critcal nitrogen additions in a duplex steel.

U.K. Patent Application No. GB2,160,221A discloses a duplex stainless steel with a controlled limitation of aluminum content to improve impact properties.

Known in the art is UNS No. J-93345, a duplex stainless steel marketed as Escaloy D. The UNS composition of the alloy is, in weight percent, chromium 20-27, molybdenum 3 to 4.5, nickel 8 to 11, nitrogen 0.1 to 0.3, manganese 1.0 max., carbon 0.08 max., phosphorus 0.04 max., sulfur 0.025 max. and the balance iron. The typical Escaloy D alloy contains, in weight percent, 0.04 carbon, 24 chromium, 9.6 nickel, 3.4 molybdenum, 1.07 silicon, 0.55 manganese, 0.21 copper, 0.2 nitrogen, balance iron and containing about 235 PPM oxygen. The alloy may be a cast or wrought structural product, tubular or down hole equipment, for use in deep gas wells containing nominally about 30% hydrogen sulfide.

While these patents disclose compositions of duplex stainless steels, they do not solve the problems of welding said steels. These duplex steels have certain limitations, when welded, probably due, in part, to the nitrogen content. Generally in the welded condition: (1) the ductility and toughness are lower, (2) the postweld heat treatment results in reduced strength and (3) the corrosion resistance of the alloy is lowered. There is a need in the art for a welding filler material that has the properties of duplex stainless steel base materials, including corrosion resistance, ductility and high strength. Post welding tensile and impact strength are especially required.

OBJECTS OF THE INVENTION

The principal object of this invention is to provide a duplex stainless steel with increased toughness.

Another important object of this invention is to provide a tough duplex stainless steel with excellent corrosion resistance.

Still another object of this invention is to provide a duplex stainless steel that may be readily produced.

BRIEF DESCRIPTION OF THE INVENTION

The objects of this invention are met with the alloy as described in Table 1.

The alloy, as described in Table 1, may be produced in the form of castings, wrought products, metal powder, welding filler material and other commercial forms, such as wire, bar, plate, tube, pipe, billet and forgings.

BRIEF DESCRIPTION OF THE DRAWINGS

FIG. 1 is a graphic presentation of the effect of nickel content on toughness and ferrite content.

FIG. 2 is a graphic presentation of the effect of niobium on corrosion resistance.

TABLE 1

| | ALLOY OF THIS INVENTION COMPOSITION, IN WEIGHT PERCENT | | |
|---|---|---|---|
| ELEMENTS | BROAD RANGE | NARROW RANGE | TYPICAL |
| C | 0.07 MAX | 0.04 MAX | 0.01 |
| CR | 24.0-28.0 | 24.0-27.0 | 24.8 |
| CU | .5 TO 3.0 | 1.0-2.5 | 1.9 |
| FE | BALANCE | BALANCE | BALANCE |
| MN | UP TO 2.0 | UP TO 1.5 | 1.0 |
| MO | 2.5-4.5 | 2.9-3.4 | 3.1 |
| N | 0.13-0.30 | 0.13-0.25 | 0.18 |
| NB | UP TO 3.0 | .2 TO 1.0 | — |
| NI | 8.0-13.0 | 8.5-11.2 | 9.0 |
| P | 0.04 MAX | 0.04 MAX | 0.01 MAX |
| S | 0.03 MAX | 0.03 MAX | 0.003 MAX |
| SI | 1.0 MAX | 0.5 MAX | 0.40 |
| TA | UP TO 3.0 | UP TO 1.5 | — |
| TI | UP TO 3.0 | UP TO 1.5 | — |
| V | .8 MAX | .5 MAX | — |
| W | UP TO 2 | UP TO 1 | — |
| NI:MO | 2-4.5 | 2-4.5 | ABOUT 3 |

EXPERIMENTAL DATA AND EXAMPLES

Table 2 presents a series of experimental alloys that were prepared for testing. The alloys of this invention are identified by an asterisk as listed in Table 2.

A series of four alloys were prepared for impact testing. Weldments were made by the gas tungsten arc welding process. Table 2 presents the compositions of the four alloys, namely: Alloy 255, Alloy A, Alloy B and Alloy C.

Weldments were made using samples of commercial alloy components (similar to Alloy 255). The components were welded using the four alloys as weldments. Each welded assembly was impact-tested by the use of the well-known Charpy Impact Test. Testing was done at −100° F. Results of the impact test are graphically presented in FIG. 1.

Also, in FIG. 1, the ferrite content of the duplex alloy is plotted as a function of nickel content in each of the four alloys. The ferrite content was determined by a magnetic measurement instrument known as the Magne-gage. The instrument was modified for use over a broad range of austenite-ferrite ratios. Plotted in FIG.

1 are approximate (+ or −5%) ferrite contents as a function of nickel content in the four alloys.

It is well understood, in the stainless steel industry, that the metallurgical phase austenite (a face centered cubic phase) has excellent low-temperature toughness.

high levels of molybdenum adversely affect the usefulness of the alloy in practical fabrication.

As a result, the range of 2.5% to 3.4% molybdenum has been recognized and an optimum value of 3.1% placed on welding filler material (see Table 1).

TABLE 2

COMPOSITIONS OF EXPERIMENTAL ALLOYS, IN WEIGHT PERCENT

| ALLOY NO. | C | CR | CU | MN | MO | N | NB | NI | SI | FE | RATIO NI/MO |
|---|---|---|---|---|---|---|---|---|---|---|---|
| 255 | .01 | 25.0 | 1.7 | .8 | 3.2 | .19 | — | 5.7 | .3 | BAL | 1.78 |
| *A | .01 | 25.6 | 1.7 | .8 | 3.1 | .16 | — | 8.8 | .5 | BAL | 2.84 |
| *B | .01 | 25.5 | 1.7 | .8 | 3.1 | .19 | — | 10.5 | .4 | BAL | 3.39 |
| *C | .01 | 25.4 | 1.7 | .7 | 3.1 | .17 | — | 12.4 | .4 | BAL | 4.00 |
| D | .01 | 25.3 | 1.7 | .8 | 3.2 | .26 | — | 5.8 | .3 | BAL | 1.81 |
| E | .02 | 25.2 | 1.7 | .7 | 3.2 | .19 | — | 5.8 | .2 | BAL | 1.81 |
| *F | .01 | 25.6 | 1.7 | .7 | 3.1 | .23 | — | 8.6 | .5 | BAL | 2.77 |
| *G | .025 | 24.1 | 1.8 | 1.1 | 3.5 | .10 | — | 10.2 | .3 | BAL | 2.91 |
| H | .01 | 25.13 | .01 | 1.0 | 3.06 | .24 | — | 9.42 | .46 | BAL | 3.07 |
| *I | .007 | 24.61 | .90 | .9 | 3.00 | .22 | — | 9.04 | .5 | BAL | 3.01 |
| *J | .011 | 24.68 | 2.4 | 1.0 | 2.90 | .17 | .05 | 8.98 | .5 | BAL | 3.09 |
| *K | ND | 24.3 | 2.1 | .9 | 3.8 | ND | — | 9.3 | .3 | BAL | 2.44 |
| L | .02 | 25.3 | 1.7 | .4 | 3.2 | .22 | — | 5.7 | .7 | BAL | 1.78 |
| M | .02 | 25.6 | 1.8 | .7 | 3.2 | .21 | — | 5.6 | .3 | BAL | 1.75 |
| *N | .01 | 25.5 | 1.6 | .4 | 3.1 | .19 | — | 8.6 | .9 | BAL | 2.77 |
| *O | .02 | 24.66 | 2.28 | .93 | 2.88 | .21 | .5 | 8.97 | .5 | BAL | 3.11 |
| *P | .02 | 24.44 | 2.26 | .95 | 2.83 | .25 | 1.02 | 8.95 | .5 | BAL | 3.16 |

*ALLOYS OF THIS INVENTION
ND—NOT DETERMINED

It would be expected that, as the quantity of austenite increased in such an alloy system, the toughness would also continue to increase. The reported results in FIG. 1 clearly indicate that the toughness does not increase monotonically with the austenitie content, contrary to expectations based on current knowledge.

This is an unexpected improvement in the art. The figure clearly shows a trend of increasing low-temperature (−100° F.) Charpy toughness up to about 10.5% nickel. Then, at higher contents up to about 12.5% nickel, the toughness values reverse direction and decrease.

Copper is an essential element in the alloy of this invention. Copper must be present in contents not less than 0.5% and not more than 3% and, typically, about 2%.

Alloy H, in Table 2, contains all essential elements within the scope of this invention except for copper content. It was found that, in most corrosion testing, copper was essential for best results. For example, in a 10% sulfuric acid test boiling for 24 hours, the corrosion rates were as follows:

Alloy H: 2317 MPY, 0.01% Cu
Alloy I: 79 MPY, 0.90% Cu
Alloy J: 80 MPY, 2.4% Cu
Alloy A: 61 MPY, 1.7% Cu MPY represents mils per years of corrosion rate. Complete analysis of the alloys are given in Table 2.

Molybdenum must be present in the alloy of this invention. There appears to be a desired ratio of about 3 to 1 between nickel and molybdenum. The nickel to molybdenum ratio is given for all alloys. In every case (except Alloy H), good engineering properties were found for alloys within a range of about 2 to 4.5 for the ratio between nickel and molybdenum. It is noted that Alloy H is within the ratio; however, the copper content is outside of the required range.

These facts point, on one hand, to the possibility of improved corrosion resistance by the increase of molybdenum but, on the other hand, strongly indicate that Silicon may be present in the alloy of this invention in contents less than about 1% and preferably under 0.5%. Silicon may provide certain metallurgical benefits; for example, fluidity. More than 0.5% silicon may result in a loss of ductility.

It was discovered that niobium (Nb), also known as columbium (Cb), is an essential element in the alloy of this invention, especially when used in certain critical environments.

The addition of niobium has also been shown to provide improvements in corrosion resistance in one common acclerated corrosion test. That particular corrosion environment was the 10% Ferric Chloride test. Under another corrosion test condition, niobium had no effect.

The effect of niobium in a severe pitting environment, 10% Ferric Chloride, can be shown by examining the corrosion rates of various niobium bearing alloys (see Table 3). In those alloys, the niobium content was varied from zero to 1%. At a test temperature of 15° C., an alloy containing 0.5% niobium (Alloy 0 in Table 2) had substantially lower corrosion rates than alloys with either no intentional additions or 1% additions of niobium (Alloy J and P in Table 2). Those data are also presented in FIG. 2.

In the ASTM G28 method A test, there is no apparent effect of niobium in the range up to 1% niobium (see Table 4). These data are plotted in FIG. 2. In a third environment, 85% phosphoric acid, there is an apparent negative effect of niobium (see Table 5). In that environment, the corrosion rates increased with the addition of niobium.

The effect of niobium was also tested in 10% sulfuric acid with the testing data presented in Table 6. These data show niobium to provide additional corrosion resistance. The content of 0.5% niobium is slightly better than the content of 1% niobium.

The data above have shown that the criticality of niobium depends upon the environment of its intended use. For this reason, niobium may be omitted from the alloy as required.

It is known in the art that tantalum is closely associated with niobium and often may replace niobium in part. Thus tantalum may be present in the alloy up to 3%.

Therefore, titanium may be present in the range disclosed in Table 1.

Other elements, such as carbon, chromium, manganese, nitrogen and vanadium, must be controlled in the alloy as is well-known in the art of duplex steels. U.S. Pats. Nos. 2,467,434, and 3,082,082 provide data and information concerning the effects of elements of addition and impurities.

The alloy of this invention, Alloy B containing 10.5% nickel, was prepared in the form of wrought product. The alloy casting and hot and cold working was identical to the wrought commercial Alloy 255 containing 5.7% nickel. The alloy was vacuum induction melted then refined by electro-slag remelting (ESR). The alloy was forged; then hot worked; then finally drawn to ⅛ inch wire for testing.

Table 7 presents the tensile data. It appears that the ultimate tensile strength is about the same for both alloys. Compared to Alloy 255, the alloy of this invention has a lower yield tensile strength but a greatly improved elongation.

It will be apparent to those skilled in the art that the novel principles of the invention disclosed herein, in connection with specific examples thereof, will support various other modifications and applications of the same. It is accordingly desired that in construing the breadth of the appended claims they shall not be limited to the specific examples of the invention described herein.

TABLE 3

CORROSION RESISTANCE OF VARIOUS ALLOYS
10% FERRIC CHLORIDE TESTS

| Alloy | Condition | Time (hrs) | Test Temperature (deg C.) | | | | |
|---|---|---|---|---|---|---|---|
| | | | 15 | 20 | 22(RT) | 30 | 35 |
| J | GTAW (as-welded) | 120 | 22 | 90 | 267 | 604 | 784 |
| | GTAW (as-welded) | 120 | 26 | 57 | 273 | 619 | 721 |
| | Average MPY | | 24 | 74 | 270 | 612 | 753 |
| O | GTAW (as-welded) | 120 | .5 | 14 | 33 | 430 | 778 |
| | GTAW (as-welded) | 120 | 2 | 28 | 40 | 397 | 738 |
| | Average MPY | | 1 | 21 | 37 | 414 | 758 |
| P | GTAW (as-welded) | 120 | 166 | 478 | 512 | 462 | 791 |
| | GTAW (as-welded) | 120 | 148 | 516 | 510 | 614 | 868 |
| | Average MPY | | 157 | 497 | 511 | 538 | 830 |

TABLE 4

CORROSION RESISTANCE OF VARIOUS ALLOYS
STREICHER TESTS
ASTM G-28 METHOD A
Test conditions: Boiling for 120 hours

| Alloy | Condition | Corrosion rate (MPY) |
|---|---|---|
| J | GTAW (as-welded) | 17 |
| | GTAW (as-welded) | 17 |
| | Average MPY | 17 |
| O | GTAW (as-welded) | 16 |
| | GTAW (as-welded) | 20 |
| | Average MPY | 18 |
| P | GTAW (as-welded) | 20 |
| | GTAW (as-welded) | 18 |
| | Average MPY | 19 |

TABLE 5

CORROSION RESISTANCE OF VARIOUS ALLOYS
85% PHOSPHORIC ACID TESTS
Test conditions: 110 deg C. for 96 hours

| Alloy | Condition | Corrosion Rate (MPY) |
|---|---|---|
| J | GTAW (as-welded) | 21 |
| | GTAW (as-welded) | 24 |
| | Average MPY | 23 |
| O | GTAW (as-welded) | 65 |
| | GTAW (as-welded) | 41 |
| | Average MPY | 53 |
| P | GTAW (as-welded) | 40 |
| | GTAW (as-welded) | 33 |
| | Average MPY | 37 |

TABLE 6

CORROSION RESISTANCE OF VARIOUS ALLOYS
10% SULFURIC ACID TESTS
Test Conditions: Boiling for 24 Hours

| Alloy | Condition | Corrosion Rate (MPY) |
|---|---|---|
| J | GTAW (as-welded) | 79 |
| | GTAW (as welded) | 80 |
| | Average MPY | 80 |
| O | GTAW (as-welded) | 57 |
| | GTAW (as-welded) | 57 |
| | Average MPY | 57 |
| P | GTAW (as-welded) | 62 |
| | GTAW (as-welded) | 71 |
| | Average MPY | 67 |

Titanium is known to be beneficial in this class of alloys that contain nitrogen. The formation of the titanium nitrides in the alloy provides improved stability.

TABLE 7

MECHANICAL PROPERTIES OF WROUGHT ALLOYS
TENSILE PROPERTIES

| ALLOY | | YIELD (ksi) | UTS (ksi) | Elong (%) |
|---|---|---|---|---|
| 255 | (5.7% Ni) | 97.5 | 128.6 | 17 |
| | (5.7% Ni) | 97.1 | 133.9 | 27 |
| | Average | 97.3 | 131.3 | 22 |
| B | (10.5% Ni) | 76.7 | 132.6 | 37 |
| | (10.5% Ni) | 76.8 | 131.7 | 38 |
| | Average | 76.8 | 132.2 | 38 |

The alloys were cold worked and annealed 1900° F for 20 minutes and water quenched.

What is claimed is:

1. Welding filler material in the form of welding filler wire made of duplex stainless steel consisting essentially of, in percent by weight, carbon 0.07 maximum, chromium 24 to 25.6, copper 1.6 to 3.0, manganese up to 2.0, molybdenum 2.5 to 4.5, nitrogen 0.13 to 0.30, niobium up to 3, nickel 8 to 13, phosphorous 0.04 maximum, sulfur 0.03 maximum, silicon 1.0 maximum, tungsten up to 2 and iron plus impurities balance, wherein the ratio of nickel to molybdenum is 2 to 4.5.

2. The steel of claim 1 wherein the steel contains carbon 0.04 maximum, chromium 24 to 25.6, copper 1.6 to 2.5, manganese up to 1.5, molybdenum 2.9 to 3.4, nitrogen 0.13 to 0.30, niobium 0.2 to 1.0, nickel 8.5 to 11.2, silicon 0.5 maximum, and tungsten up to 1.

3. The steel of claim 1 wherein the steel contains carbon about 0.01, chromium about 24.8, copper about 1.9, manganese about 1, molybdenum about 3.1, nitrogen about 0.18, nickel about 9, phosphorous 0.01 maximum, sulfur 0.003 maximum, and silicon about 0.4.

4. The steel of claim 1 wherein the steel contains a minimum of 0.2 niobium to provide resistance against pitting.

5. The alloy of claim 1 wherein the ratio of nickel to molybdenum is about 3.

* * * * *